United States Patent
Yoshida

(10) Patent No.: US 7,710,937 B2
(45) Date of Patent: May 4, 2010

(54) COMMUNICATION TERMINAL, COMMUNICATION SYSTEM, AND COMMUNICATION METHOD

(75) Inventor: Shouji Yoshida, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 704 days.

(21) Appl. No.: 11/117,687

(22) Filed: Apr. 27, 2005

(65) Prior Publication Data

US 2005/0249179 A1  Nov. 10, 2005

(30) Foreign Application Priority Data

Apr. 30, 2004 (JP) .......................... P.2004-136492

(51) Int. Cl.
- *H04B 7/216* (2006.01)
- *H04B 1/38* (2006.01)
- *H04M 1/00* (2006.01)

(52) U.S. Cl. ..................... 370/342; 455/556.1; 455/557

(58) Field of Classification Search .............. 455/550.1, 455/556.2, 557; 370/342
See application file for complete search history.

(56) References Cited

U.S. PATENT DOCUMENTS

| 7,010,624 B1 * | 3/2006 | Zhou et al. ..................... 710/8 |
| 7,079,865 B1 * | 7/2006 | Farazmandnia et al. ..... 455/557 |

FOREIGN PATENT DOCUMENTS

| JP | 2003-032381 | 1/2003 |
| JP | 2003-298762 | 10/2003 |

\* cited by examiner

*Primary Examiner*—Patrick N Edouard
*Assistant Examiner*—Michael T Thier
(74) *Attorney, Agent, or Firm*—Hogan & Hartson LLP

(57) ABSTRACT

A communication system has a personal computer (PC) which obtains a communication function by acquiring a modem driver, and a portable communication terminal which can communicate with the PC. The portable communication terminal includes a USB interface section to be connected to the PC, a RAM storing an address of a server that stores the modem driver, and a control section which downloads the modem driver from the server through a wireless communication section, and transmits the downloaded modem driver to the PC through the USB interface section.

17 Claims, 7 Drawing Sheets

COMMUNICATION TERMINAL, COMMUNICATION SYSTEM, AND COMMUNICATION METHOD

CROSS-REFERENCE TO RELATED APPLICATIONS

This application is based upon and claims the benefit of priority from the prior Japanese Patent Applications No. 2004-136492 filed on Apr. 30, 2004, the entire contents of which are incorporated herein by reference.

BACKGROUND OF THE INVENTION

1. Field of the Invention

The present invention relates to a communication terminal, such as a cellular phone, that enables to be connected to an external apparatus such as a personal computer, and a communication system and a communication method. The present invention particularly relates to a communication terminal that enables to be used as a communication modem when the communication terminal is connected to an external apparatus by USB (Universal Serial Bus) which is a bidirectional communication interface.

2. Description of the Related Art

A function is presently available that permits a portable communication terminal such as a cellular phone to be connected to a personal computer (hereinafter referred to simply as a PC) via a USB port, and that controls the portable communication terminal to serve as a communication modem (see, for example, JP-A-2003-298762.).

In order to provide this function for a PC, and to prepare for the employment of the portable communication terminal as a communication modem, a modem driver must first be installed in the PC.

A modem driver is provided for a PC using one of the following first, second and third methods.

According to the first method, a modem driver is provided through a recording medium such as a CD-ROM which is packaged with a portable communication terminal.

According to the second method, a PC that can access the Internet using communication means other than a portable communication terminal, e.g., by using a fixed, dial-up telephone line connection, is employed to download a modem driver from a server.

According to the third method, when a portable communication terminal is connected to a PC, the PC automatically accesses an FTP server on the Internet and obtains driver version information. Then, if a compressed file for a driver program has been stored in memory, the driver version information for this file can be read and compared with driver version information obtained from the FTP server, and the newer version of the two can automatically be installed in the memory of the PC.

JP-A-2003-298762 is referred to as a related art.

However, when these methods are employed, the following disadvantages adversely affect their usefulness.

For the first method whereby a recording medium, such as a CD-ROM, is included in a package, there is disadvantage that expense for packaging the recording media is needed and that a user cannot update the modem driver to the latest version.

For the second method whereby a modem driver is obtained through the Web by a PC that accesses the Internet, there is disadvantage that the modem driver can not be downloaded when the PC has no access to the Internet.

For the third method whereby access to the Internet is always required to confirm the driver version when a portable communication terminal is connected to a PC, there is disadvantage that it is wasteful in time and inconvenient to establish a communication link for this purpose, since driver versions are not so frequently updated.

Furthermore, the browser of the portable communication terminal is activated each time a link is established. Thus, there is disadvantage in convenience that even when no updated driver version is available, the activated browser must be closed in order for a user to do other tasks each time the link is established.

SUMMARY OF THE INVENTION

An object of the present invention is to provide a communication terminal, a communication system and a communication method in which the latest driver can be easily obtained without an extra expense even if an external apparatus has no access to the Internet.

The invention provides a communication terminal, having: an external interface to be connected to an external apparatus; a storage section which stores an address of a server in which a modem driver is stored; a wireless communication section which wirelessly communicates with the server via a communication network; and a control section which downloads the modem driver from the server through the wireless communication section and transmits the downloaded modem driver to the external apparatus through the external interface when the external apparatus is connected to the external interface.

In the communication terminal, the control section downloads the modem driver when the external interface and the external apparatus are connected by USB (Universal Serial Bus).

The communication terminal further has: a notification section, wherein when the transmission of the modem driver to the external apparatus is completed, the control section controls the notification section to notify the completion of the transmission.

In the communication terminal, after transmission of the modem driver to the external apparatus, the control section controls the communication terminal as a modem to be operated by the external apparatus.

In the communication terminal, the control section controls the communication terminal as a modem to be operated by the external apparatus when an access request using the modem driver is made by the external apparatus.

The communication terminal further has: a notification section, wherein the control section examines a communication rate for the wireless communication section before downloading the modem driver, and when a communication rate at the communication rate is low, the control section controls the notification section to notify that the communication rate is low.

The invention also provides a communication system, having: an external apparatus which obtains a communication function by acquiring a modem driver; and a communication terminal which communicates with the external apparatus, wherein the communication terminal includes: an external interface to be connected to the external apparatus; a storage section which stores an address of a server in which the modem driver is stored; a wireless communication section which wirelessly communicates with the server via a communication network; and a control section which downloads the modem driver from the server through the wireless communication section and transmits the downloaded modem driver to the external apparatus through the external interface when the external apparatus is connected to the external interface.

The invention also provides a communication system, having: a server which stores a modem driver; and a communication terminal which communicates with the server through a communication network, wherein the communication terminal includes: an external interface to be connected to an external apparatus; a storage section which stores an address of the server; a wireless communication section which wirelessly communicates with the server via the communication network; and a control section which downloads the modem driver from the server through the wireless communication section and transmits the downloaded modem driver to the external apparatus through the external interface when the external apparatus is connected to the external interface.

The invention also provides a communication method of a communication terminal in connection to an external apparatus to communicate with the external apparatus, the communication terminal which wirelessly communicates with a server via a communication network, having the steps of: determining whether the communication terminal is connected to an external apparatus which obtains a communication function by acquiring a modem driver; downloading the modem driver from a server in which the modem driver is stored through the communication network, when the communication terminal is connected to the external apparatus; and transmitting the downloaded modem driver to the external apparatus.

In the communication terminal, the communication terminal is a cellular phone.

In the communication terminal, the cellular phone is a pursuant to CDMA 2000.

According to the communication terminal, the communication system and the communication method, even if the external apparatus has no access to the Internet, the latest driver can be easily obtained without an extra expense.

DETAILED DESCRIPTION OF THE PREFERRED EMBODIMENTS

An embodiment of the present invention will now be described with reference to the accompanying drawings.

Figure 1:
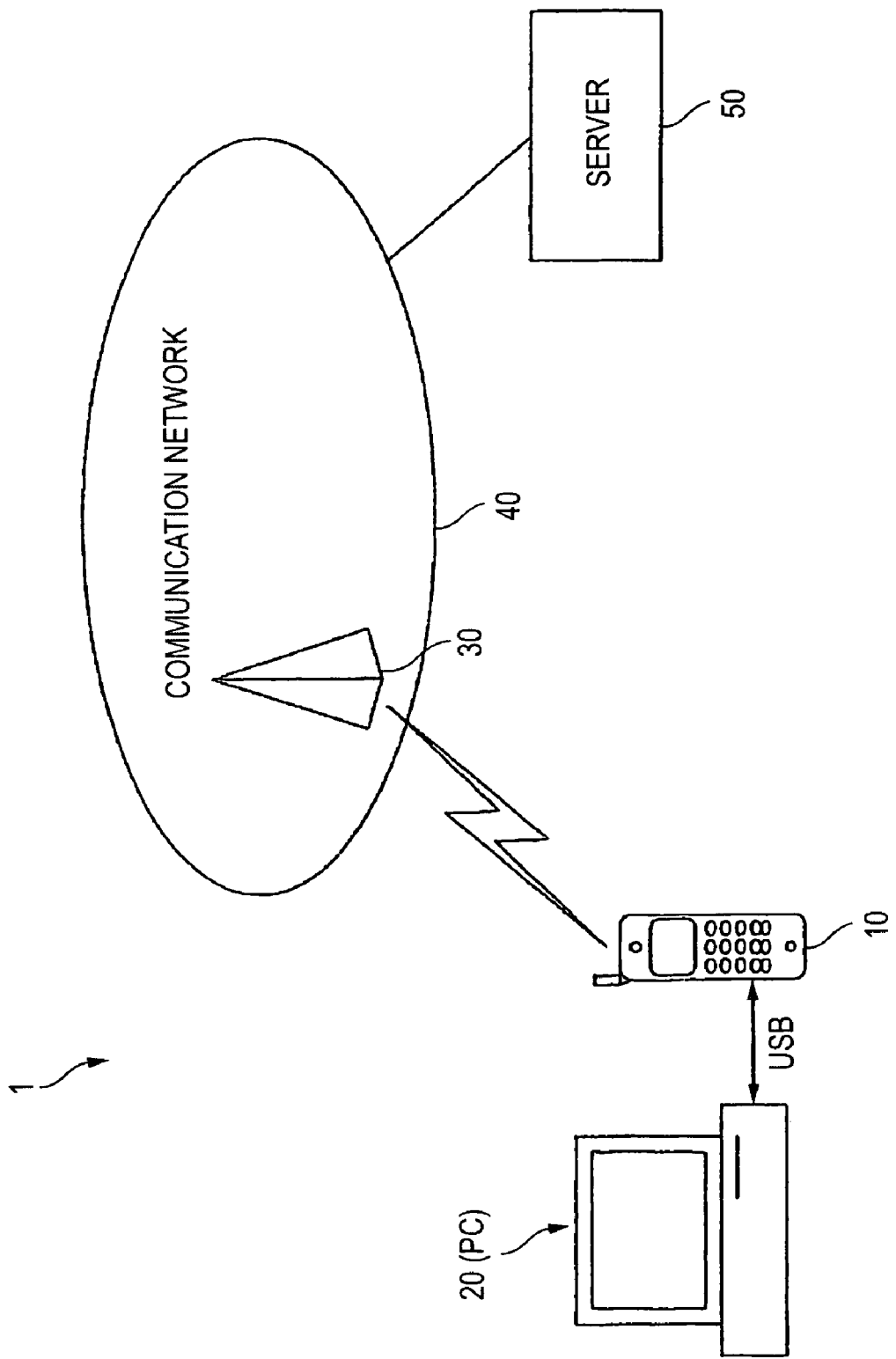
FIG. 1 is a diagram showing the configuration of a communication system that employs a portable communication terminal according to one embodiment of the present invention.

FIG. 1 is a diagram showing a communication system that employs a portable communication terminal according to one embodiment of the present invention.

A communication system 1 has a portable communication terminal 10 such as a cellular phone, a personal computer (PC) 20 which enables to connect to the portable communication terminal 10 through USB and enables to obtain a communication function by acquiring a modem driver, a base station 30, a wireless communication network (network) 40, and a server 50 which stores a modem driver and is located on the network 40.

The portable communication terminal 10 of the embodiment has a function for accessing the network 40 such as the web, and can be plugged into the PC 20 through USB. The USB driver of the portable communication terminal 10 supports a storage function and a modem function, and also has a USB driver switching function.

That is, the portable communication terminal 10 is a portable terminal that can perform network communication and can serve as a modem when connected to the PC 20.

The portable communication terminal 10 may be connected, by itself, to an independent network provided by a cellular phone service provider.

In the communication system 1, the portable communication terminal 10 downloads a modem driver used in the PC 20 through the network 40, such as the web, and stores the modem driver in a memory of the portable communication terminal 10 Thereafter, the PC 20 recognizes the memory as an external memory, and installs the modem driver stored in the memory. In this manner, without having to use a recording medium, such as a CD, a modem driver can be provided for the PC 20 and employed by a user.

The communication system 1 can employ the two following methods. The first and second methods will now be explained with reference to the flowcharts respectively shown in FIGS. 2 and 3.

<First Method>

Figure 2:
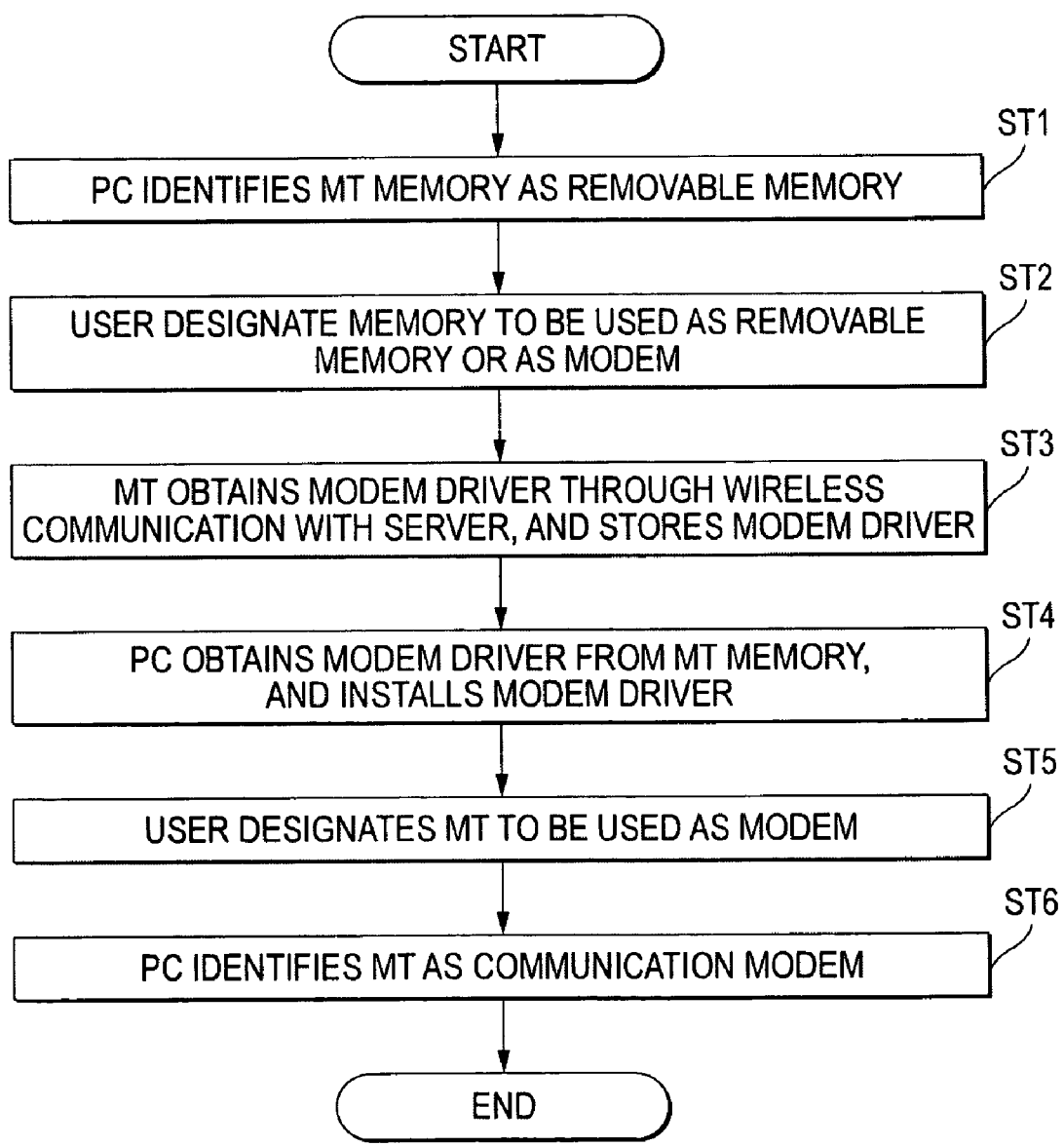
FIG. 2 is a flowchart showing a first method according to the embodiment.

When the portable communication terminal (MT) 10 and the personal computer (PC) 20 are connected to each other using the USB, at step ST1 of FIG. 2, the PC 20 identifies as removable memory the memory (data folder) provided for the MT 10.

In the initial (default) state, the MT 10 is identified as removable memory by the PC 20; however, at step ST2, a user sets (or can set) the MT 10 to be used as either removable memory or as a modem.

When MT 10 is set to be used as a modem, program control advances to step ST3. When the MT 10 is designated for use as a removable memory, the process is terminated.

At step ST3, the MT 10 independently performs wireless communication to download a modem driver through the web (via a server 50 on the Internets), and stores the obtained modem driver in memory (a data folder).

At step ST4, the PC 20 obtains the modem driver from the memory (the data folder) of the MT 10, and installs it.

After the installation of the modem driver has been completed, at step ST5, the PC 20 can identify as a modem the MT 10 to which it is connected through the USB, and the user sets the MT 10 to be used as a modem.

At step ST6, the PC 20 identifies the MT 10 as a communication modem.

As is described above, according to the first method, the user manually sets the MT 10 to be in a USB mode.

According to the following second method, the USB mode is automatically set.

<Second Method>

Figure 3:
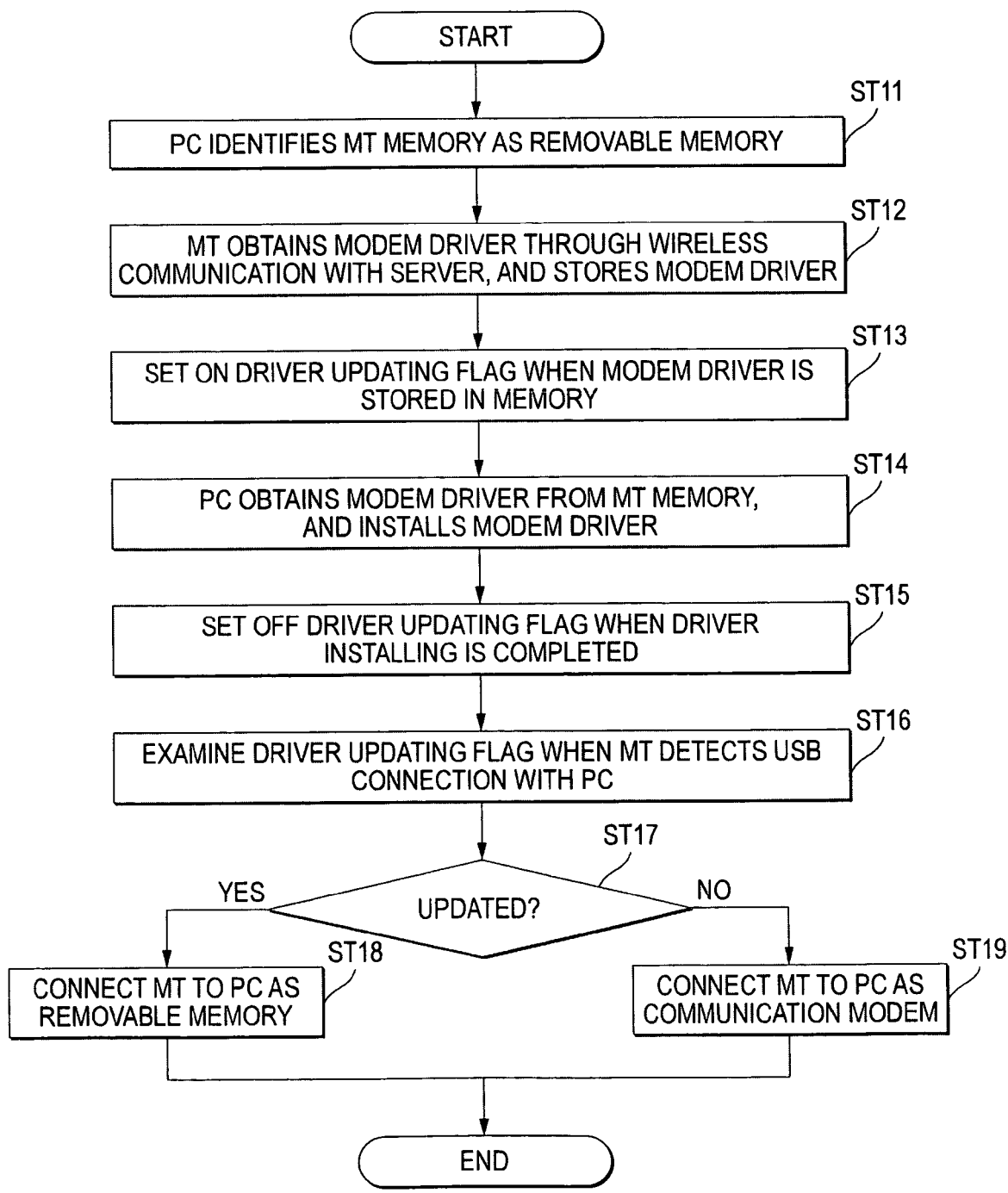
FIG. 3 is a flowchart showing a second method according to the embodiment.

When the portable communication terminal (MT) 10 and the personal computer (PC) 20 are connected to each other through the USB, at step ST11 of FIG. 3, the PC 20 identifies the memory (the data folder) of the MT 10 as removable memory.

At step ST12, the MT 10 independently performs wireless communication to download a modem driver through the web (the server 50 on the Internet), and stores the obtained modem driver in memory (the data folder).

At step ST13, when the MT 10 has downloaded the modem driver through the web and stored it in memory, the MT 10 sets a driver update flag in the memory that indicates the driver has been updated (flag ON).

At step ST14, the PC 20 obtains the modem driver from the memory of the MT 10 and installs it.

At step ST15, after the PC 20 has installed the modem driver, the state of the driver update flag is returned to "No Update" (flag OFF).

At step ST16, when the MT 10 detects the USB connection to the PC 20, the state of the driver update flag is examined. When the driver is updated at step ST17, at step ST18 the MT 10 is connected, as removable memory, to the PC 20. When the driver is not updated, at step ST19, the MT 10 is connected to the PC 20 as a modem.

An explanation will now be given for a specific configuration and an example of function for the portable communication terminal 10 that can perform network communication and that can also serve as a modem when connected to the PC 20 through the USB.

Figure 4:
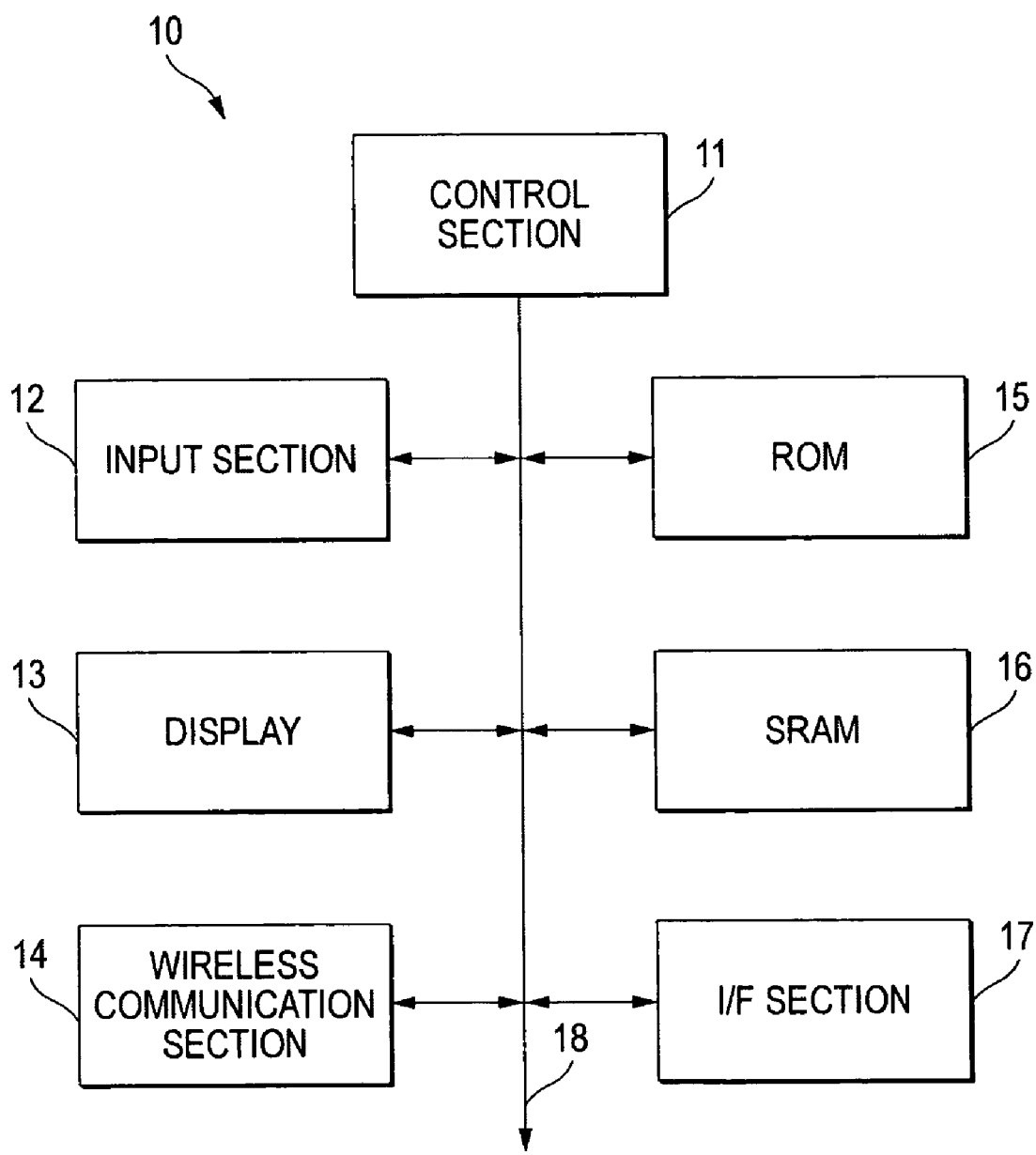
FIG. 4 is a block diagram showing an example of arrangement for the portable communication terminal according to the embodiment.

FIG. 4 is a block diagram showing an example of configuration for the portable communication terminal 10 according to the embodiment.

As is shown in FIG. 4, the portable communication terminal 10 includes a control section 11, an input section 12, a display 13, a wireless communication section 14, a ROM 15, a SRAM 16, and a USB interface (I/F) section 17. The input section 12 is operated by a user to manipulate the portable communication terminal 10 in order to send or to receive a call and independently access the Web. The input section 12 is also operated to change the USB mode, and to download a modem driver through the Internet. The display 13 displays the current setup and a setup menu for a user. The display 13 also displays as a notification means. The wireless communication section 14 accesses the Internet to obtain a modem driver, and accesses the network 40 when "modem" mode is set as the USB mode. The ROM 15 stores a program. The SRAM 16 stores the setup for the USB mode. The USB interface (I/F) section 17 is connected to the PC 20. The address of the server 50 storing the modem driver is also stored in the SRAM 16. Furthermore, the portable communication terminal 10 includes a microphone and a loudspeaker (now shown) which are controlled by the control section 11 and used for communication. The loudspeaker is considered as one embodiment of a notification means. These sections are connected through an external bus 18.

The control section 11 reads various system programs from the ROM 15 and executes them, and also controls the individual sections.

Further, the control section 11 controls the display and the sound and the communication performed by the portable communication terminal 10, and reads various programs from the ROM 15 and the SRAM 16 and executes them to drive the individual sections.

When the control section 11 determines that a USB connection has been established between the USB interface section 17 and the PC 20, which is an external apparatus, the control section 11 employs the address stored in the SRAM 16 to initiate communication with the server 50 via the wireless communication section 14, and to download a modem driver.

Furthermore, the control section 11 determines whether the PC 20, which is an external apparatus, is connected to the USB interface section 17 through the USB. When these two are connected through the USB, the control section 11 controls the wireless communication section 14 to download the modem driver.

After the control section 11 has transmitted the modem driver to the PC 20 via the USB interface section 17, the control section 11 displays a transmission end message on the display 13, which is notification means for notifying completion of transmission to a user.

Though not shown in FIG. 4, when the portable communication terminal 10 is a cellular phone, for example, a sound release section, such as a loudspeaker, is included. Thus, as notification means, the sound release section may be employed to release sound and to notify a user that the transmission of the modem driver to the PC 20 has been completed.

When the portable communication terminal 10 is set to be used as a modem after notifying the completion of the transmission, the control section 11 sets the PC 20 to be a master in communication.

In addition, the control section 11 also controls to set the PC 20 to be a master in communication when an access point request using the modem driver is made by the PC 20.

At present, multiple types of portable communication terminals that can handle a plurality of communication systems have appeared, as have many portable communication terminals that provide communication systems having communication rates that differ considerably, such as the CDMA 2000 system and the EVDO system, for which the respective communication rates are about 144 kbps and about 2 Mbps.

In this case, according to the embodiment, when the USB connection is detected and the accessing of the server 50 starts to download a modem driver, the following configuration may be employed, that depends on the amount of data included in the modem driver. The control section 11 reconfirms the peripheral network condition, and when communication using the EVDO system, which is the faster communication system, is enabled, it permits the communication process to start immediately. When communication using the EVDO system is not enabled, however, the communication process is not started by the control section 11, and to notify a user, a message, "downloading time will be extended", is displayed on the display 13, such as an LCD. Or since the user may be watching only the display screen of the PC 20, a warning sound may be output through the loudspeaker which releases a ringing tone. The display of a message and the release of a warning sound may be employed simultaneously.

Furthermore, the downloading of a modem driver may be started after the capability of the PC 20 has been confirmed.

Figure 5:
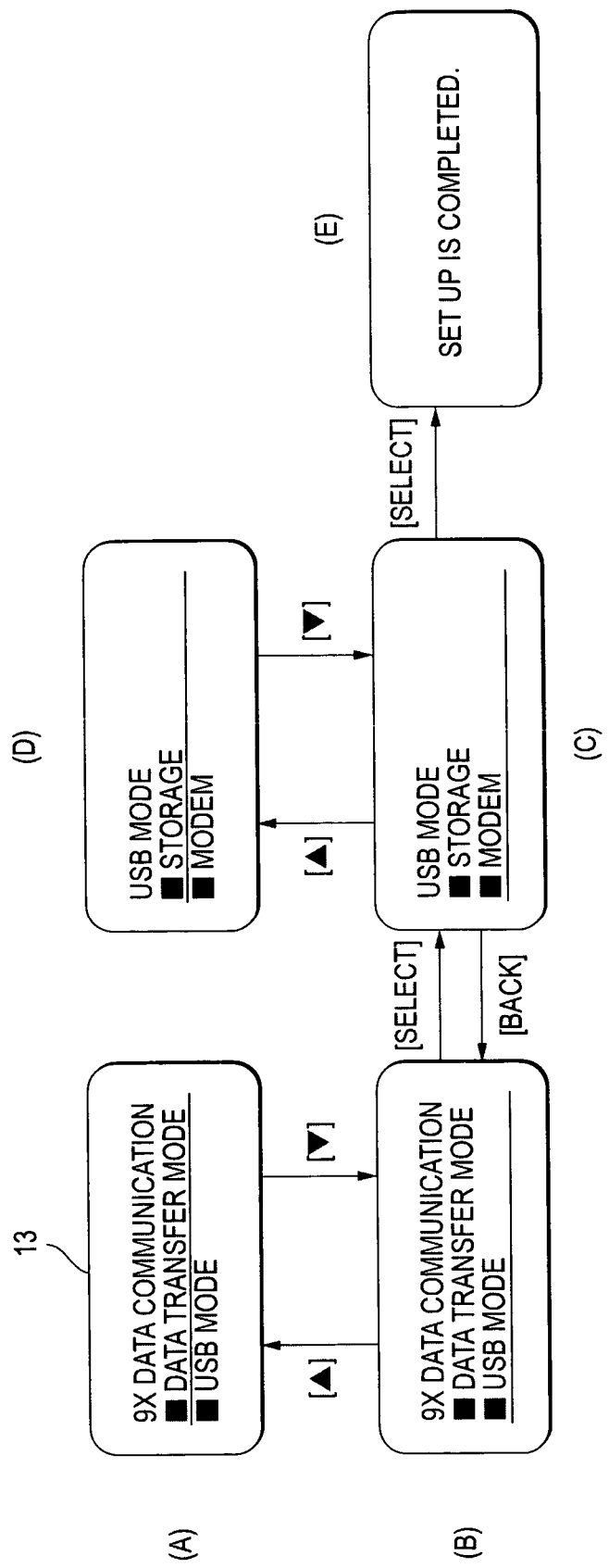
FIG. 5 is a diagram showing example of displays on a display when a user identifies a USB mode as either a "storage" mode or a "modem" mode.

FIG. 5 shows diagrams showing an example of messages presented on the display 13 when a user employs the portable communication terminal 10 to set the USB mode to be either a "storage" mode or a "modem" mode.

As shown by the screens (A) and (B) in FIG. 5, a "data transfer mode" and a "USB mode" are displayed as communication modes on the display 13.

When, as shown by the screens (C) and (D) in FIG. 5, "USB mode" is selected and the enter button is pressed, as the "USB modes", both "storage" and "modem" are displayed.

To select "modem", the enter button is operated on the screen (C) shown in FIG. 5, and the modem setup is completed.

To select "storage", the enter button is operated on the screen (D) shown in FIG. 5, and the storage setup is completed.

When this setup has been completed, as is shown by the screen (E) in FIG. 5, a message stating that the setup has been completed is displayed.

The control section 11 then stores, in the SRAM 16, the USB mode that the user has selected, on the screen, using the input section 12.

When the portable communication terminal 10 is connected to the PC 20 through the USB interface (I/F) section 17, the control section 11 reads the USB mode setup stored in the SRAM 16 and executes a program stored in the ROM 15.

When the USB mode is set to be "storage", the portable communication terminal 10 is identified as an external memory by the PC 20.

When the USB mode is set to be "modem", the portable communication terminal 10 is identified as a modem by the PC 20.

Figure 6:
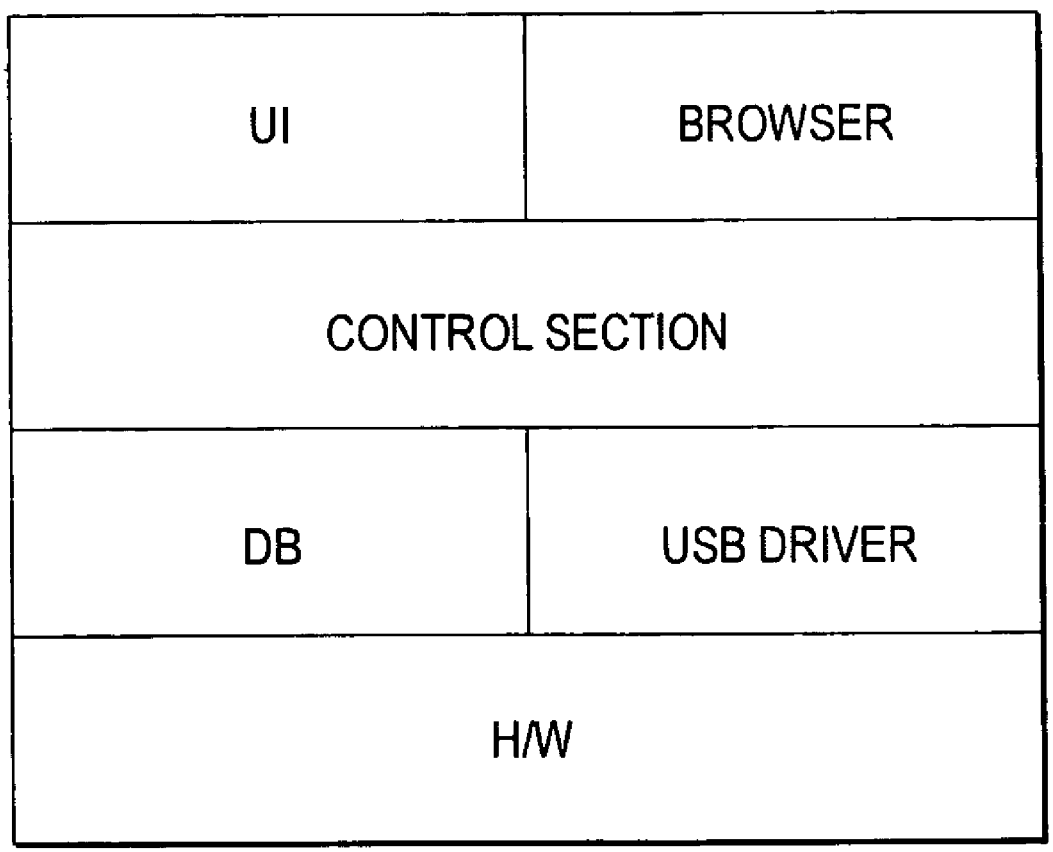
FIG. 6 is a block diagram showing an example of program stored in a ROM in FIG. 6.

The program stored in the ROM 15 that executes the above operation is shown in a block diagram in FIG. 6.

In FIG. 6, a user employs a browser to download, from the Internet, a modem driver for the PC 20 and to store the driver in the SRAM 16 of the portable communication terminal 10.

In order to do this, a browser module must determine that the modem driver for the PC 20 is an effective download file.

In FIG. 6, a controller stores a downloaded file in a DB. The stored file only need be identified by the PC, regardless of whether it is identified as a driver file or as an unknown file by the portable communication terminal 10.

It should be noted that, as the default, the USB setup value for the portable communication terminal 10 on the SRAM 16 is set to be "storage".

As is described above, when the portable communication terminal 10 is connected to the PC 20, the portable communication terminal 10 is identified as an external memory by the PC 20.

The user then employs the PC 20 to install the modem driver that is stored in the SRAM 16 of the portable communication terminal 10.

To install the modem driver, the user, for example, executes a file "setup.exe" to perform the installation automatically, or manually stores the driver at a predetermined location.

After the modem driver has been installed, the user performs the UI operation to set the USB mode to be "modem" on the predetermined menu.

Through the DB, the controller sets to be "modem" the USB setup value in the SRAM 16.

After the USB mode has been set to be "modem", and when the portable communication terminal 10 has been connected to the PC 20 via the USB interface section 17, the USB driver for the portable communication terminal 10 examines the USB setup value in the SRAM 16 and automatically changes the port for the connection, so that the portable communication terminal 10 is identified as a modem by the PC 20.

Figure 7:
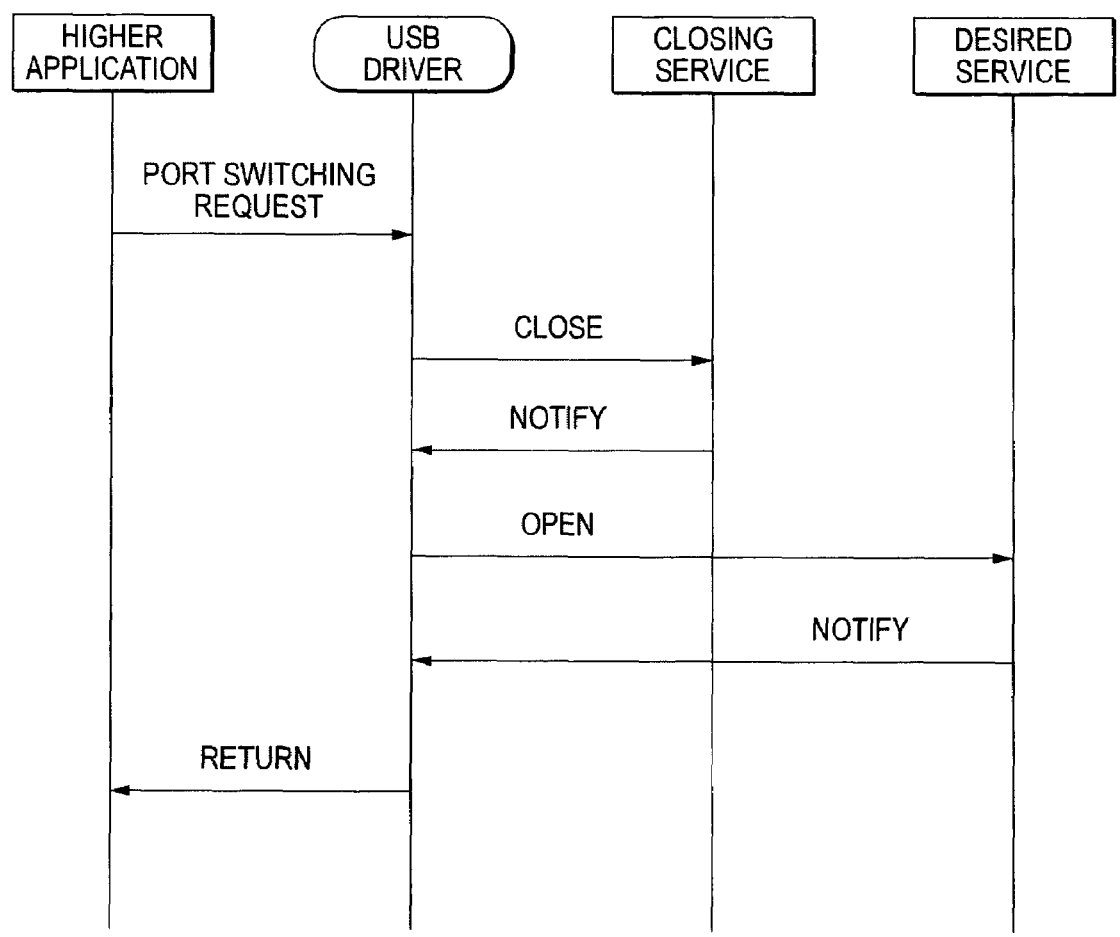
FIG. 7 is a sequence diagram showing the USB mode switching process performed by the portable communication terminal according to the embodiment.

FIG. 7 is a sequence diagram showing the USB mode switching process performed by the portable communication terminal 10.

When a user changes the USB mode and establishes the USB connection, or changes the USB mode by using the portable communication terminal 10 in the USB connection, the USB driver receives a port switching request from a higher application and issues a close request (CLOSE) to close the storage function.

A storage service confirms that the closing has been completed and transmits a notification of the completion to the USB driver.

The USB driver receives the notification, from the storage service that employed the port, confirming that the closing has been completed (NOTIFY) and issues an open request (OPEN) to open the modem function.

A modem service then confirms the opening has been successful and transmits a notification of the success to the USB driver (NOTIFY).

When the USB driver receives the notification that the modem function has been opened, as requested by the application, the USB driver transmits a notification of the reception to the application (Return).

In this embodiment, the user has employed the input section 12 to manually change the USB mode of the portable communication terminal 10. However, this is merely an example, and the present invention can also be applied for a method, like the second method explained with reference to FIG. 3, whereby the USB mode is automatically changed to the storage mode when the driver is updated through the Internet, and whereby, after the driver has been installed, the mode is automatically changed to the modem mode.

As is described above, according to the embodiment, the communication system has the PC 20 which obtains a communication function by acquiring the modem driver, and the portable communication terminal 10 which can communicate with the PC 20. The portable communication terminal 10 includes the USB interface section 17 to which the PC 20 is connected, the RAM 16 storing the address of the server 50 for storing the modem driver, and the control section 11 which determines that the USB connection has been established between the PC 20 and the USB interface section 17, and then controls the wireless communication section 14 to communicate with the server 50, and which also downloads from the server 50 the modem driver to transmit to the PC 20 through the USB interface section 17.

That is, the portable communication terminal 10 and the PC 20 can be plugged in by using the USB connection, and the memory (data folder) in the portable communication terminal 10 can be employed as removable memory. Furthermore, the portable communication terminal 10 includes a function for obtaining a modem driver through the web and for automatically saving it in a predetermined memory (data folder), and since the USB driver of the portable communication terminal 10 supports the storage function and the modem function, the storage function and the modem function of the USB driver only need to be switched between each other, so that the extra expense of packaging a recording medium can be avoided.

Therefore, the present invention is effective when a recording medium is not packaged with a portable communication terminal.

Further, the latest driver can be downloaded and obtained even in an environment wherein Internet access is disabled by the PC.

Furthermore, the portable communication terminal 10 can be used either as a removable memory or a communication modem.

So long as the portable communication terminal 10 is within communication range, the modem function of the portable communication terminal 10 is effectively operable. When the portable communication terminal 10 is not within communication range, this case need not be considered because a modem driver would not be useful, even if it could be obtained.

From another point of view, according to the present invention, the following two points are apparent.

(1) A user who has no other network connection means can obtain a modem driver through a network.

According to the conventional techniques, only device drivers other than modem drivers are available on a network. This is because network connection is disabled without a modem driver.

(2) It is not necessary to include a CD-ROM as bundled software though it is not assured that a user will actually use the CD-ROM, so that the cost can be reduced and consideration can be given to the environment problem.

For example, for terminals such as EVDO compatible terminals, which can cope with high communication rates, the number of users who employ the terminals as modems will probably increase. However, there are still many users who employ these terminals basically as cellular phones, and so long as the users who desire modem drivers do not greatly exceed those who do not plan to use the terminals as modems, the sale of a packaged modem driver for which there are various extraneous, additional costs should be avoided.

Furthermore, while taking into account the fixed communication fee system provided for the EVDO and the downloading speed, making a modem driver available on a network is an effective distribution means.

What is claimed is:

1. A portable communication terminal, comprising:
   an external interface to be connected to an external apparatus;
   a storage section which stores an address of a server in which a modem driver for applying a communication function to the external apparatus is stored;
   a wireless communication section which wirelessly communicates with the server via a communication network;
   a selecting section; and
   a control section which downloads the modem driver from the server through the wireless communication section, stores the downloaded modem driver in the storage section and transmits the downloaded modem driver to the external apparatus through the external interface when the external apparatus is connected to the external interface,
   wherein the control section is operable in a storage mode in which the control section controls the storage section of the portable communication terminal to serve as a removable memory for the external apparatus and a modem mode in which the control section controls the portable communication terminal to serve as a communication modem for the external apparatus using the modem driver, and
   wherein the selection section selects one of the storage mode and the modem mode in which the control section operates, and wherein the control section is configured to download the modem driver from the server in response to the selection section selecting the modem mode.

2. The communication terminal according to claim 1, wherein the control section downloads the modem driver when the external interface and the external apparatus are connected by Universal Serial Bus.

3. The communication terminal according to claim 1, further comprising:
   a notification section,
   wherein when the transmission of the modem driver to the external apparatus is completed, the control section controls the notification section to notify the completion of the transmission.

4. The communication terminal according to claim 1, wherein, after transmission of the modem driver to the external apparatus, the control section controls the portable communication terminal as a modem to be operated by the external apparatus.

5. The communication terminal according to claim 1, wherein the control section controls the portable communication terminal as a modem to be operated by the external apparatus when an access request using the modem driver is made by the external apparatus.

6. The communication terminal according to claim 1, further comprising:
   a notification section,
   wherein the control section examines a communication rate for the wireless communication section before downloading the modem driver, and when a communication rate at the communication rate is low, the control section controls the notification section to notify that the communication rate is low.

7. The communication terminal according to claim 1, wherein the portable communication terminal is a cellular phone.

8. The communication terminal according to claim 7, wherein the cellular phone is a pursuant to CDMA 2000.

9. The communication terminal according to claim 1, wherein the control section stores the downloaded modem driver in the storage section with setting a driver update flag on, which indicates the driver has been updated.

10. The communication terminal according to claim 9, wherein the control section setting the driver update flag off once the modem driver is installed in the external apparatus.

11. The communication terminal according to claim 10, wherein if the driver update flag is set off when the external apparatus is connected to the external interface, the control section controls the portable communication terminal as a model to be operated by the external apparatus.

12. A communication system, comprising:
   an external apparatus which obtains a communication function by acquiring a modem driver; and
   a portable communication terminal which communicates with the external apparatus,
   wherein the portable communication terminal includes:
   an external interface to be connected to the external apparatus;
   a storage section which stores an address of a server in which the modem driver is stored;
   a wireless communication section which wirelessly communicates with the server via a communication network;
   a selecting section; and
   a control section which downloads the modem driver from the server through the wireless communication section, stores the downloaded modem driver in the storage section and transmits the downloaded modem driver to the external apparatus through the external interface when the external apparatus is connected to the external interface,
   wherein the control section is operable in a storage mode in which the control section controls the storage section of the portable communication terminal to serve as a removable memory for the external apparatus and a modem mode in which the control section controls the portable communication terminal to serve as a communication modem for the external apparatus using the modem driver, and
   wherein the selection section selects one of the storage mode and the modem mode in which the control section operates, and wherein the control section is configured to download the modem driver from the server in response to the selection section selecting the modem mode.

13. A communication system, comprising:
a server which stores a modem driver; and
a portable communication terminal which communicates with the server through a communication network,
wherein the portable communication terminal includes:
an external interface to be connected to an external apparatus;
a storage section which stores an address of the server;
a wireless communication section which wirelessly communicates with the server via the communication network;
a selecting section; and
a control section which downloads the modem driver for applying a communication function to the external apparatus from the server through the wireless communication section, stores the downloaded modem driver in the storage section and transmits the downloaded modem driver to the external apparatus through the external interface when the external apparatus is connected to the external interface,
wherein the control section is operable in a storage mode in which the control section controls the storage section of the portable communication terminal to serve as a removable memory for the external apparatus and a modem mode in which the control section controls the portable communication terminal to serve as a communication modem for the external apparatus using the modem driver, and
wherein the selection section selects one of the storage mode and the modem mode in which the control section operates, and wherein the control section is configured to download the modem driver from the server in response to the selection section selecting the modem mode.

14. The communication terminal according to claim 13, wherein the control section stores the downloaded modem driver in the storage section with setting a driver update flag on, which indicates the driver has been updated.

15. The communication terminal according to claim 14, wherein the control section setting the driver update flag off once the model driver is installed in the external apparatus.

16. The communication terminal according to claim 15, wherein if the driver update flag is set off when the external apparatus is connected to the external interface, the control section controls the portable communication terminal as a model to be operated by the external apparatus.

17. A communication method of a portable communication terminal in connection to an external apparatus to communicate with the external apparatus, the portable communication terminal which wirelessly communicates with a server via a communication network, comprising the steps of:
determining whether the portable communication terminal is connected to an external apparatus, wherein the portable communication terminal obtains a communication function by acquiring a modem driver;
downloading the modem driver from a server in which the modem driver is stored through the communication network, when the portable communication terminal is connected to the external apparatus;
storing the downloaded modem in the portable communications terminal; and
transmitting the downloaded modem driver to the external apparatus,
selecting by a selection section a storage mode or a modem mode in which a control section of the portable communication terminal operates, and downloading the modem driver in response to the selection section selecting the modem mode, and wherein
the control section is operable in the storage mode in which the control section controls the storage section of the portable communication terminal to serve as a removable memory for the external apparatus the modem mode in which the control section controls the portable communication terminal to serve as a communication modem for the external apparatus using the modem driver.

* * * * *